MULTITERMINAL ENCAPSULATED RESISTANCE-CAPACITANCE DEVICE

Original Filed Nov. 27, 1964 4 Sheets-Sheet 1

INVENTORS.
PIERRE L. BOURGAULT
JOOST BATELAAN
BY [signature]
ATTORNEY

INVENTORS.
PIERRE L. BOURGAULT
JOOST BATELAAN
BY Robert Levine
ATTORNEY

ATTENUATION AND PHASE ANGLE VERSUS FREQUENCY
MEASURED ON TANTALUM DISTRIBUTED COMPONENT

INVENTORS.
PIERRE L. BOURGAULT
JOOST BATELAAN
BY [signature]
ATTORNEY

INVENTORS.
PIERRE L. BOURGAULT
JOOST BATELAAN
BY Robert Levine
ATTORNEY 3,538,394

MULTITERMINAL ENCAPSULATED RESISTANCE-CAPACITANCE DEVICE

Pierre L. Bourgault, Etobicoke, Ontario, and Joost Batelaan, Toronto, Ontario, Canada, assignors to Johnson Matthey and Mallory, Ltd., Toronto, Ontario, Canada, a corporation Original application Nov. 27, 1964, Ser. No. 414,223, now Patent No. 3,371,295, dated Feb. 27, 1968. Divided and this application Aug. 21, 1967, Ser. No. 670,000
The portion of the term of the patent subsequent to Sept. 13, 1983, has been disclaimed
Int. Cl. H01g *9/14*
U.S. Cl. 317—230 6 Claims

ABSTRACT OF THE DISCLOSURE

The present invention relates to a distributed resistance-capacitance means. The resistance-capacitance device includes an elongated anode of film forming metal e.g. tantalum having a dielectric film formed thereon and a solid electrolyte layer formed thereon by conversion of manganese nitrate. The anode has one cathode contact attached to each longitudinal extremity of the anode. A cathode lead is attached to each of the cathode contacts. An anode riser is attached to the anode, the location of which is not critical. The anode and the plurality of cathodes are encapsulated by an insulating means.

Figure 1:
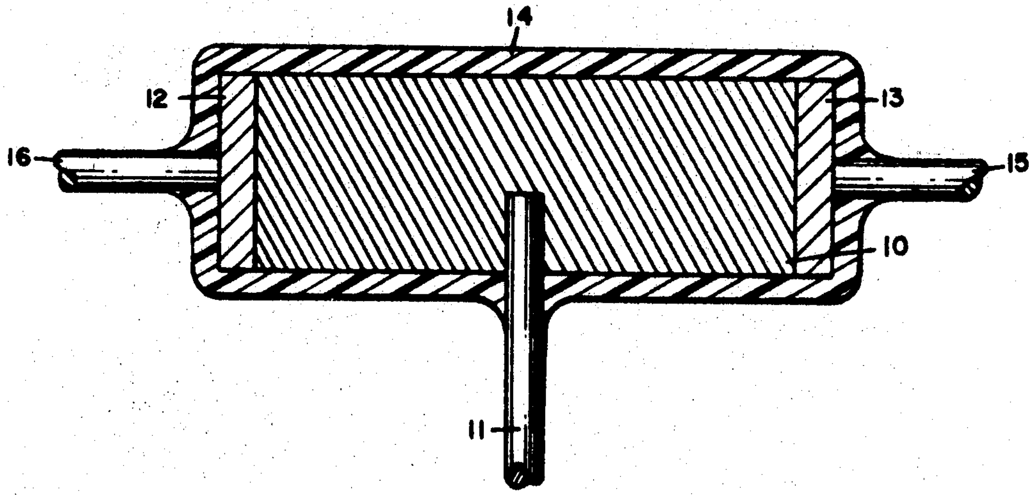

This is a division of application Ser. No. 414,223, filed Nov. 27, 1964.

The present invention relates to the distributed resistance-capacitance of a unitary device. A porous, sintered tantalum slug is utilized to provide either predetermined transfer functions or predetermined impedance functions over a selected frequency range. The present invention also relates to the distributed resistance-capacitance of a unitary device in which a roll of metal coated, thin insulating material is utilized to provide either predetermined transfer functions or predetermined impedance functions over a selected frequency range.

Generally, the present invention pertains to modified solid tantalum capacitors, to modified paper capacitors and to modified capacitors sold under the trademark Mylar whose inherent resistive properties are utilized to attain particular transfer functions or particular impedance functions over a selected frequency range. A solid tantalum capacitor has its capacitance distributed throughout its porous tantalum slug. Each of the miniature capacitance elements in the porous slug is connected to outside terminals by low resistive tantalum on one side thereof and by higher resistive electrolyte on the other side thereof. It is seen therefore, that the solid tantalum capacitor is a distributed resistance-capacitance device in which the electrolyte resistivity and the distance between each capacitance element to the outside contact is minimized.

The tantalum device of the present invention is constructed similar to the solid tantalum capacitor. However, two essential and important differences exist between the known tantalum capacitor and the modified tantalum device of the present invention. The essential differences from the known tantalum capacitor are: (1) the electrolyte resistivity is increased to a predetermined value, while in the tantalum capacitor the resistivity is minimized; and (2) the cathode terminals are connected to the electrolyte at the far sides of the device in order to obtain a maximum spread in the distance from each capacitance element to the outside contacts.

Likewise, the metal coated paper and the Mylar devices of the present invention are similar in construction to the known paper and the known Mylar capacitors. Distributed resistance-capacitance is obtained by connecting contacts to the far extremities of the foil instead of to one side of the foil as is presently done. The foil resistance can be controlled by varying the metallic thickness, the width, and the length of the foil.

The electronic functions provided by the device of the present invention are similar to the functions provided by distributed resistance-capacitance units fabricated utilizing thin film network processes. Similar functions may also be achieved by R-C networks comprised of three or more resistance and capacitance components.

The present invention differs from thin film devices in that it is operable at substantially lower frequencies. Thin film distributed resistance-capacitance devices do have a smaller total capacitance than the devices of the present invention. This difference allows the device of the present invention to be used in a lower frequency range than is feasible with the thin film devices. For example the devices of the present invention operate in the frequency range of .1 c.p.s. to $10^6$ c.p.s. Therefore, these devices can be used in the audio frequency range where it has been found that the use of a thin film device is not practical.

It is seen that the single device having distributed resistance-capacitance is an improvement over a multicomponent network where both have similar electronic functions. The device of the present invention has many uses among which are that the device can be used as an R-C low pass filter, as an R-C high pass filter, as an R-C delay line, as a phase shift network in feedback control, as a positive gain device in an R-C oscillator, and can be used to perform other functions obvious to those persons having ordinary skill in the art.

It is therefore, an object of the present invention to provide a device having resistance-capacitance linearly and uniformly distributed between two terminals of the device.

Another object of the present invention is to provide a single element device having the same electrical characteristics as a thin film distributed resistance-capacitance device but capable of functioning at a lower predetermined frequency range.

Still another object of the present invention is the novel positioning of the cathode contacts on the far extremities of the tantalum slug of the tantalum device.

Yet another object of the present invention is the positioning of nonpolar contacts on the far extremities of the metal foil, of the paper, and of the Mylar devices.

The invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in conjunction with the accompanying figures of the drawing wherein like reference characters describe elements of similar function and wherein the scope of the invention is determined from the appended claims.

For illustrative purposes the invention will be described in conjunction with the appended drawings in which, FIG. 1 is an enlarged fragmentary sectional view of the tantalum device of the present invention.

Figure 2A:
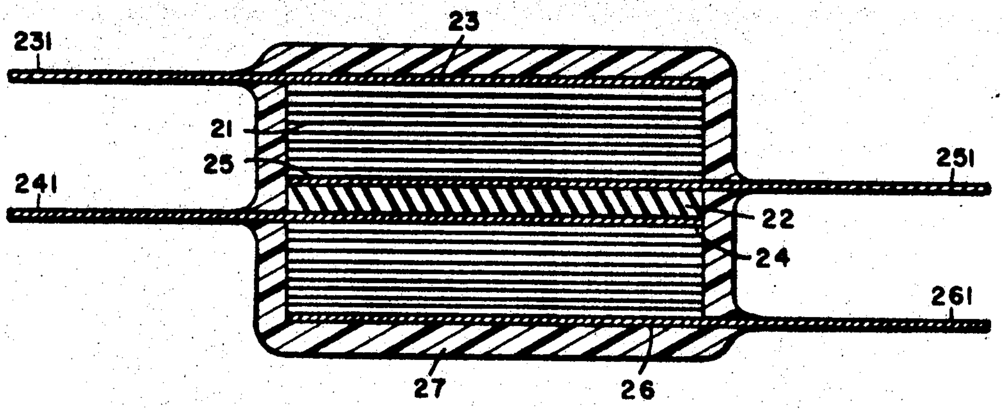

FIG. 2*a* is an enlarged fragmentary sectional view of the four terminal paper and the Mylar devices of the present invention.

Figure 2B:
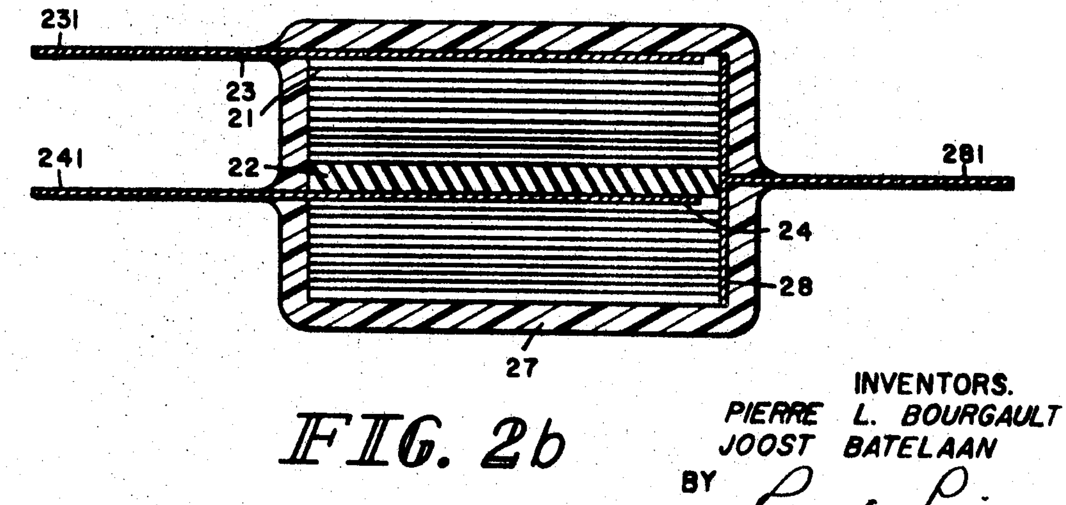

FIG. 2*b* is an enlarged fragmentary sectional view of the three terminal paper and the Mylar devices of the present invention.

Figure 3A:
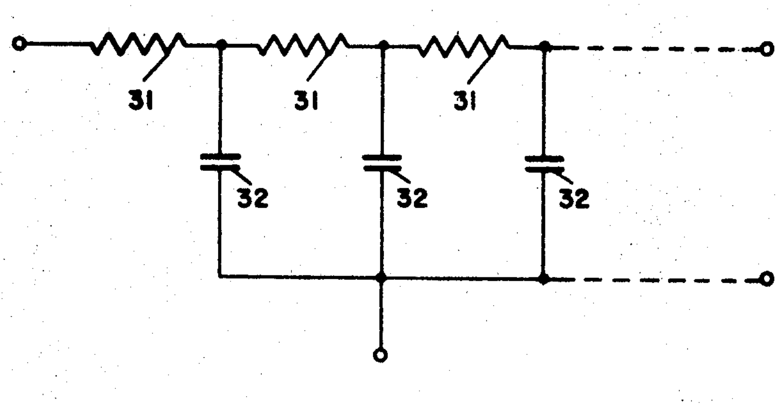
Figure 3B:
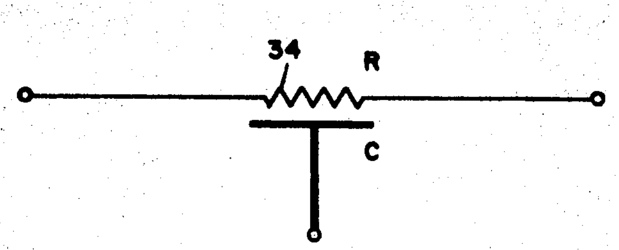
Figure 3C:
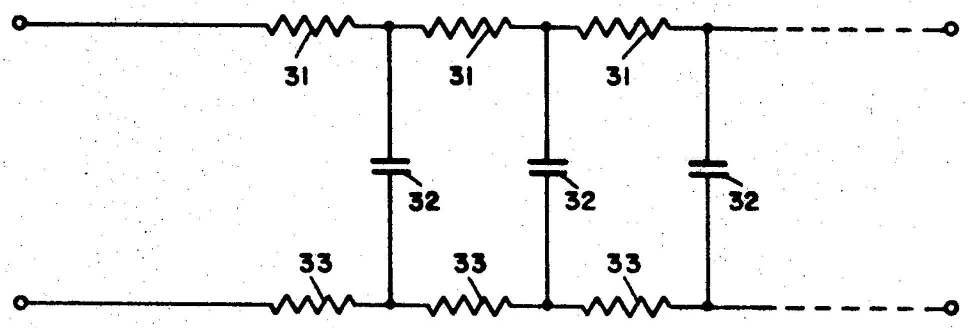
Figure 3D:
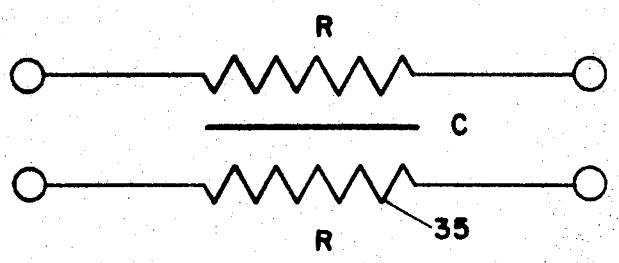

FIG. 3*a* is the schematic representation of the equivalent circuit of the device in FIG. 1 and FIG. 2*b*. FIG. 3*b* represents the symbol thereof. FIGS. 3*c* and 3*d* are respectively the schematic representation of the equivalent circuit and the symbol of the device in FIG. 2*a*.

Figure 4:
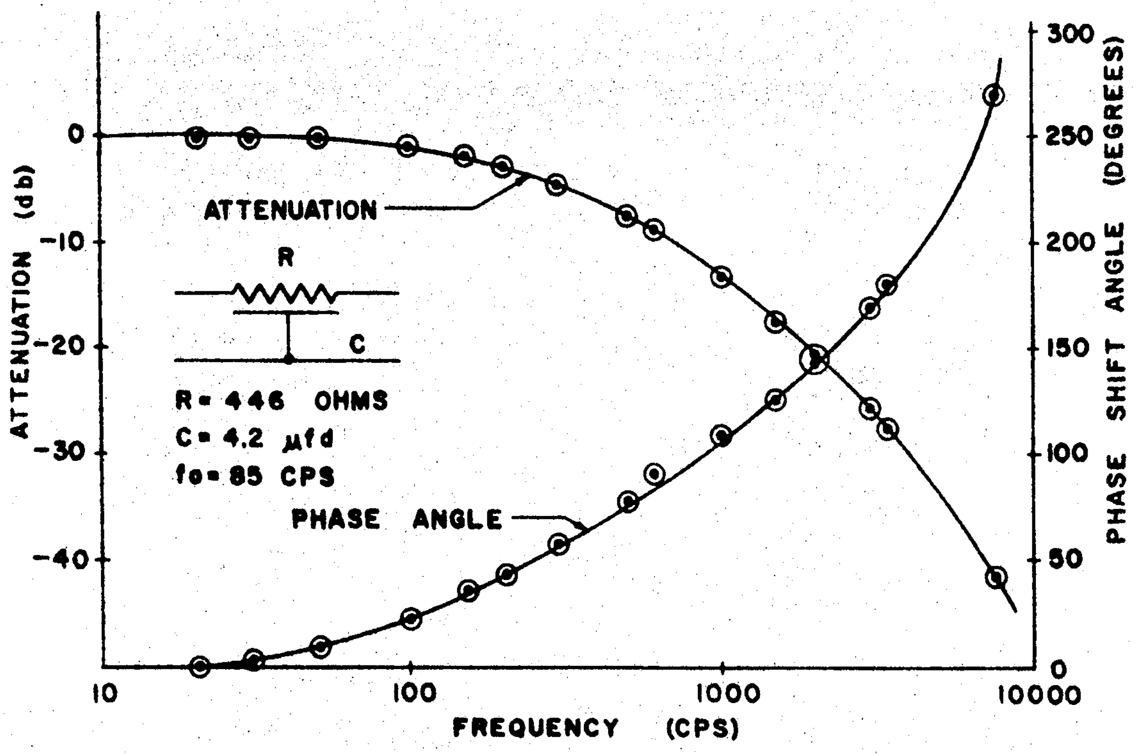

FIG. 4 is a graph showing the transfer function characteristics of a representative tantalum device.

Figure 5A:
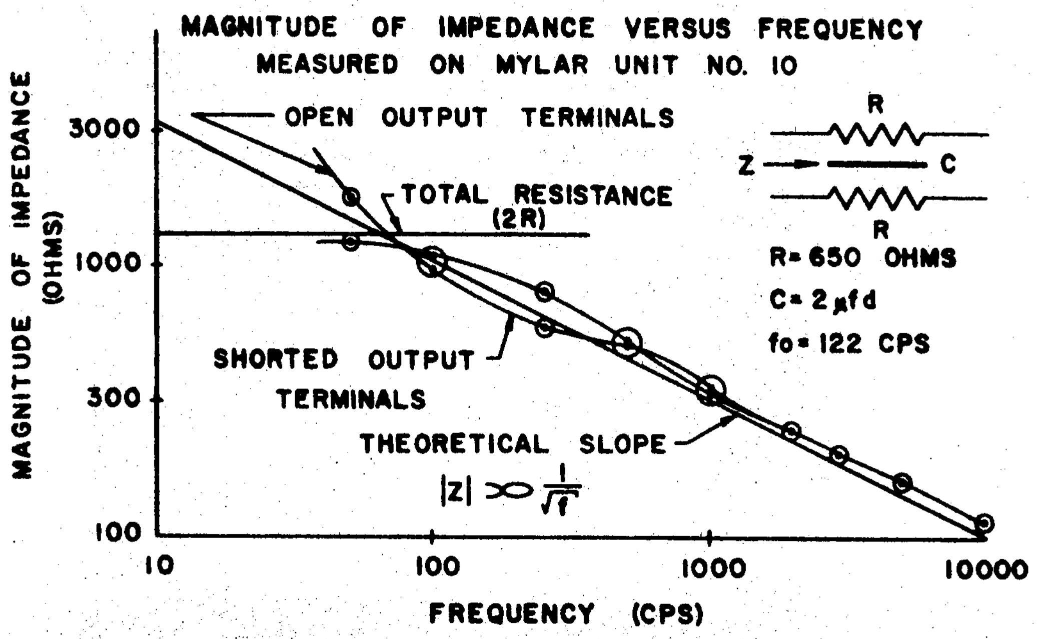
Figure 5B:
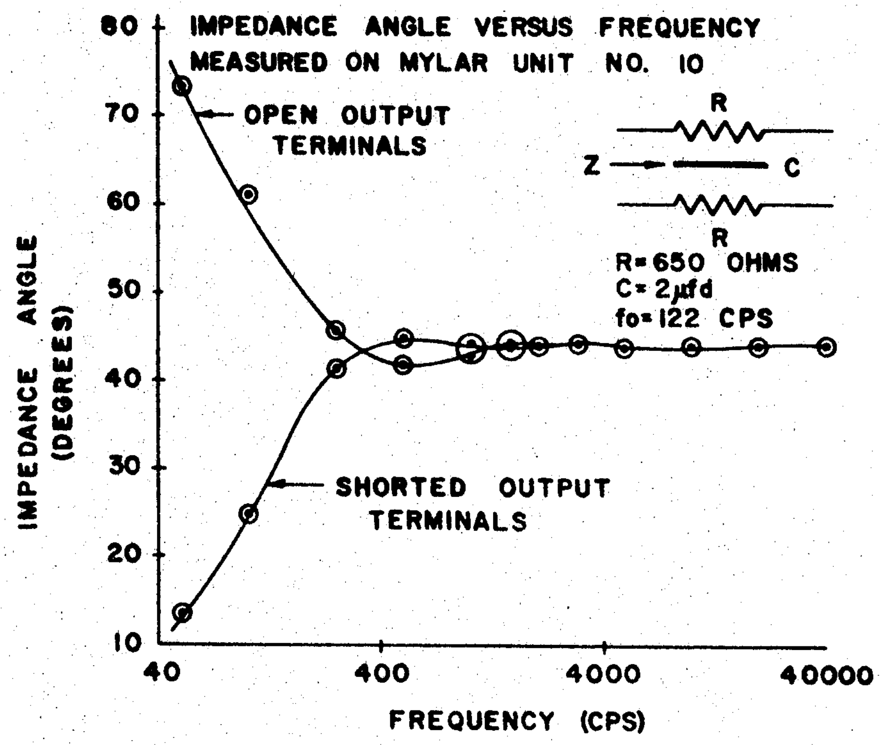

FIGS. 5*a* and 5*b* are graphs showing the impedance function characteristics of a representative metal coated thin insulating film device.

Generally speaking, the invention comprises means and methods for producing a component having the characteristic properties of distributed resistance-capacitance between its terminals as related to the frequency over a specified frequency range.

More particularly, the present invention relates to a distributed resistance-capacitance means. The resistance-capacitance device includes an elongated anode of film forming metal e.g. tantalum having a dielectric film formed thereon and a solid electrolyte layer formed thereon by conversion of manganese nitrate. The anode has one cathode contact attached to each longitudinal extremity of the anode. A cathode lead is attached to each of the cathode contacts. An anode riser is attached to the anode, the location of which is not critical. The anode and the plurality of cathodes are encapsulated by an insulating means.

A second type of distributed resistance-capacitance device includes two separate and distinct metal coated insulated films convolutely wound around an insulating center piece. An electrically conductive strip is attached to the metal coating at each of the two extremities of a first one of the films. On the four terminal device an electrically conductive strip is attached to the metal coating at each of the two extremities of the second of the two films. On the three terminal device a contact is provided to the edge of the metal coating on the second of the two films. An electrically conductive lead is attached to the above mentioned contact. The two films are encapsulated by an insulating means.

A two terminal distributed resistance-capacitance device is obtained by eliminating any one of the electrodes of a three terminal tantalum device and of a three terminal metal coated insulating film device. Also, a two terminal device is obtained by eliminating any two of the four electrodes of a four terminal metal coated insulating film device.

Referring to FIG. 1 of the drawings, which illustrates an embodiment of the present invention, tantalum anode 10 is shown. The anode is fabricated from tantalum powder by any known and suitable method. A rod or riser 11 fabricated from tantalum is welded to the anode or integrally pressed and sintered to the anode to provide an external terminal for the anode. The surface of the anode 10 is provided with a dielectric film (not shown) of tantalum oxide by anodization in any known and suitable manner. The porous anode is impregnated with manganous nitrate which on conversion leaves a manganese dioxide coating on the pores of the tantalum anode. The manganese dioxide (not shown) is the electrolytic cathode of the distributed resistance-capacitance medium of the distributed resistance of the device. A metal cathode coating 12 is applied in any suitable manner to an extremity of the elongated anode to thereby provide a contact to the manganese dioxide. On the second extremity of the anode a second metal cathode coating 13 is applied to provide a contact to the manganese dioxide. Lead connections are coupled to the metallic cathodes 12 and 13 by electrically conductive wire leads 15 and 16 respectively. The device is encased or encapsulated in housing 14 fabricated from any suitable material so as to provide physical protection from possible harmful handling and to act as a seal to prevent moisture from the surrounding atmosphere contacting the tantalum anode.

The total capacitance of the device is regulated by two important factors, they are: (1) the total volume of the anode; and (2) the thickness of the dielectric film. The total resistance of the device is regulated by the resistivity of the manganese dioxide inside the porous anode and by the length and cross-sectional area of the anode. The resistivity in turn is regulated by varying the amount of manganese dioxide inside the anode. It is seen, therefore, that the device of the present invention has a predetermined total capacitance and has a predetermined total resistance.

FIG. 2*a* shows sectional views of two metal coated film devices of the present invention. The device consists of roll 21 of the two metal coated insulating films wound around an insulated center piece 22. The metal is deposited on the insulating film by any known and suitable fabrication method. Care must be taken to avoid contact between the metal of one film and the metal of the other film otherwise the usefulness of the device is lost. Electrically conductive strips 23 and 24 are attached to the metal coating at the extremities of one of the films. On the four terminal device in FIG. 2*a* similar electrically conductive strips 25 and 26 are attached to the ends of the metallic coating of the second film. With regard to the three terminal device shown in FIG. 26, contact is made to the metal of the second film by providing a metal coating 28 to the side of the film. Lead connections are made to the metallic strips 23, 24, 25 and 26 and to the metallic coating 28 by electrically conductive wire leads 231, 241, 251, 261 and 281 respectively. The device is encased or encapsulated in housing 27 to provide physical protection and to act as a seal against matter from outside the device.

The total capacitance of the device is determined by the following items: (1) the total surface area of the metal coating on one of the films; (2) by the dielectric constant; and (3) by the thickness of the insulating film used. The total capacitance appears between leads 231 and 241 acting as one eletcrode and leads 251 and 261, or lead 281 acting as the other or second electrode. The total resistance between leads 231 and 241 or leads 251 and 261 is determined by the length, the width, the thickness and the resistivity of the metal coating on the film. It is therefore possible to obtain a predetermined total capacitance of the device and a predetermined total resistance between the end contacts of each of the two metallic coated films.

The electrical circuit equivalent of the devices of FIG. 1 and FIG. 2 are shown in FIGS. 3*a* to 3*d*. The circuit equivalent of the three terminal device is a ladder network comprised of a plurality of resistors 31 and a plurality of capacitors 32. The circuit equivalent of the four terminal device is a ladder network of a plurality of resistors 31 and 33 and a plurality of capacitors 32. The numerals utilized to denote the symbols of the three and four terminal device are 34 and 35 respectively.

FIG. 4 shows the transfer function characteristics of a representative tantalum device of the present invention in one of the several possible two part arrangements. The attenuation and phase shift angle versus frequency are typical for a distributed resistance-capacitance device and are equivalent to the characteristics of thin film distributed resistance-capacitance device at much higher frequencies. The metalized thin film devices of the present invention exhibit the same transfer function characteristics. The frequency at which there is a certain attenuation and a certain phase angle is inversely proportional to the product of the total resistance and the total capacitance of the device. It is therefore possible to obtain the transfer characterilstics shown in FIG. 4 within a predetermined frequency range by fabricating a device which has the corresponding total capacitance and the corresponding total resistance.

The impedance characteristics of two of the many possible two terminal arrangements of a representative metal coated thin film device of the present invention are shown in FIGS. 5*a* and 5*b*. The arrangement and the angle of the impedance between two terminals of a four terminal device are shown with the remaining two terminals open and shorted and as a function of the frequency. The slope of the impedance magnitude graph FIG. 5*a* indicates that above a certain frequency the magnitude of the impedance is inversely proportional to the square root of the frequency. Also, the graph of the impedance angle FIG. 5*b* indicates that above a certain frequency the impedance angle remains close to 45 degrees. Again, these characteristics are typical for uniform and linear distributed resistance-capacitance devices and were also obtained on the tantalum devices of the present invention.

Although the present invention has been disclosed in connection with preferred embodiments, variations and modifications may be resorted to by those skilled in the art without departing from the scope of the novel concepts of the invention and as set forth in the appended claims.

Having thus described our invention, we claim:

1. A distributed resistance-capacitance means comprising: an elongated anode of film forming metal having a dielectric film formed thereon; an electrolyte layer formed thereon, said anode having a plurality of cathode contacts attached to said electrolyte layer; cathode leads attached to each of said cathode contacts; an anode riser, said riser attached to said anode, said anode and said plurality of cathodes encapsulated by an insulating means.

2. A distributed resistance-capacitance means comprising: an elongated porous anode of tantalum having a dielectric film formed thereon; a solid electrolyte layer formed thereon by conversion of manganese nitrate, said anode having a plurality of cathode contacts attached to said electrolyte layer; cathode leads attached to each of said cathode contacts; and an anode riser, said riser attached to said anode, said anode and said plurality of cathode encapsulated by an insulating means.

3. A distributed resistance-capacitance means comprising: an elongated anode of porous tantalum having a dielectric film formed thereon, a solid electrolyte layer formed thereon by conversion of manganese nitrate, said anode having at least two cathode contacts attached to said electrolyte layer; cathode leads attached to each of said cathode contacts; and an anode riser, said riser attached to said anode, said anode and said plurality of cathodes encapsulated by an insulating means.

4. A distributed resistance-capacitance means comprising: an elongated anode of porous tantalum having a dielectric film formed thereon, a solid electrolyte layer formed thereon by conversion of manganese nitrate, said anode having one cathode contact attached to each extremity of said anode; cathode leads attached to each of said cathode contacts; and an anode riser, said riser attached to said anode, said anode and said plurality of cathodes encapsulated by an insulating means.

5. A distributed resistance-capacitance means comprising: an elongated anode of porous tantalum having a dielectric film formed thereon; a solid electrolyte layer formed thereon by conversion of manganese nitrate, said anode having one cathode contact attached to one extremity of said anode; a cathode lead attached to said cathode contact; and a riser, said riser attached to said anode, said anode and said cathode encapsulated by an insulating means.

6. A distributed resistance-capacitance means comprising: an elongated anode of porous tantalum having a dielectric film formed thereon; a solid electrolyte layer formed thereon by conversion of manganese nitrate, said anode having one cathode contact attached to each extremity of said anode; and cathode leads attached to each of said cathode contacts; said anode and said plurality of cathodes encapsulated by an insulating means.

References Cited

UNITED STATES PATENTS

| | | | |
|---|---|---|---|
| 1,900,018 | 3/1933 | Lilienfeld | 317—231 X |
| 3,022,472 | 2/1962 | Tanenbaum et al. | 333—70 |
| 3,054,029 | 9/1962 | Wagner et al. | 317—230 |
| 3,115,496 | 12/1963 | Fritsch | 317—230 |
| 3,206,658 | 9/1965 | Markarian | 317—230 |
| 3,255,386 | 6/1966 | Millard et al. | 317—230 |
| 3,273,027 | 9/1966 | Bourgault et al. | 317—230 |

JAMES D. KALLAM, Primary Examiner

U.S. Cl. X.R.

317—231